Patented May 26, 1953

2,640,068

UNITED STATES PATENT OFFICE 2,640,068

METHOD OF PREPARING AN ISOCYANATE

Frederic C. Schaefer and Erhart K. Drechsel, Stamford, Conn., assignors to American Cyanamid Company, New York, N. Y., a corporation of Maine No Drawing. Application August 20, 1949, Serial No. 111,570

8 Claims. (Cl. 260—453)

This invention relates to the preparation of isocyanates (isocyanic esters), and more particularly to a new and improved method of preparing a hydrocarbon monoisocyanate, that is, an isocyanate represented by the formula RNCO (I), where R represents a monovalent hydrocarbon radical. The invention is especially concerned with an improved method of preparing a hydrocarbon monoisocyanate (hydrocarbon isocyanate), e. g., allyl isocyanate, which comprises bringing into intimate contact, at a temperature within the range of −40° C. to +10° C., preferably at from −40° C. to 0° C., a hydrocarbon amine, e. g., allyl amine, and phosgene in the ratio of 2 moles of the former to not less than 1 mole of the latter, at least one-half (or slightly less in some cases, as shown in examples which follow) of the molar amount of the said amine being a primary, monohydrocarbon amine corresponding to the desired hydrocarbon monoisocyanate, and any other amine being a tertiary hydrocarbon amine (e. g., triethyl amine), removing the amine hydrochloride which is formed and unreacted phosgene from the reaction mass, converting the hydrocarbon-carbamyl chloride in the residue to the corresponding hydrocarbon monoisocyanate, for instance by thermal decomposition, by dehydrochlorination with a base (e. g., calcium oxide, quinoline, etc.) or by other suitable means, and then recovering the said isocyanate.

It was known prior to our invention that isocyanates could be prepared by reaction between phosgene and an amine corresponding to the desired isocyanate. It also was known that aliphatic esters of isocyanic acid could be prepared by reaction between an aliphatic sulfate and potassium cyanate. The suggestion also has been made that aliphatic isocyanates be prepared by pyrolyzing an N-alkyl, N-alkoxyalkyl or N-alkoxyalkoxyalkyl carbamate, followed by separation of the isocyanic ester from the pyrolysis products before the latter have had time to reunite and form the starting N-substituted carbamate.

The prior methods of preparing isocyanates in the liquid phase from phosgene and an amine have usually involved a high-temperature phosgenation of the reaction mass until reaction ceases. This serves to convert a considerable amount of the amine hydrochloride which is formed to the corresponding isocyanate, but the reaction is quite slow and inert by-products (e. g., isocyanurates, uretidinediones, etc., depending upon the amine employed and other factors) are produced in proportion to the time of reaction. Long reaction periods are particularly objectionable when certain unsaturated isocyanates, e. g., p-isopropenylphenyl isocyanate, are being produced since the monomeric isocyanate tends to polymerize during the long reaction period and thus reduces the yield of monomer. In the case of aliphatic isocyanates long reaction periods lead to excessive trimerization to isocyanurates.

It is a primary object of the present invention to provide a new and improved method or process of preparing hydrocarbon monoisocyanates.

Another object of the invention is to produce hydrocarbon monoisocyanates from phosgene and an amine corresponding to the isocyanate to be produced in a higher overall yield than previously has been possible, and with less phosgene handling than heretofore has been required.

Still another object of the invention is to provide a relatively simple and inexpensive process of making hydrocarbon monoisocyanates whereby the use of high temperatures (e. g., temperatures above 100 C. for any prolonged period) are avoided.

A further object of the invention is to avoid the difficulties previously encountered in converting an amine hydrochloride to an isocyanate, as previously has been done in prior methods of producing an isocyanate from phosgene and an amine, by eliminating such a conversion step.

These and other objects are attained as briefly described in the first paragraph of this specification and more fully hereafter.

The present invention is based largely upon our discovery that the overall yield of isocyanate (hydrocarbon monoisocyanate) from reaction between phosgene and a primary, monohydrocarbon amine can be increased (1) if the initial reaction be carried out at a relatively low temperature, e. g., at a temperature of the order of −40° C. to +10° C.; and (2) if the amine hydrochloride which is formed and unreacted phosgene be removed from the reaction mass rather than, as previously has been done, to attempt to convert all the amine hydrochloride first to the carbamyl chloride and thence to the isocyanate in one operation over a long period, which is objectionable for the reasons previously mentioned.

In accordance with our invention phosgene and either a primary, monohydrocarbon amine alone, or a mixture of a primary, monohydrocarbon amine and a tertiary hydrocarbon amine wherein the former constitutes at least one-half (or slightly less in some cases, as shown in examples which follow) of the total molar amount of amines in the said mixture, are co-reacted as indicated, or by various permutations of reactants where three reactants are involved, at a low temperature of the order of −40° C. to +10° C. to yield approximately equal molar proportions of hydrocarbon-carbamyl chloride and amine hydrochloride. Without deliberately causing the reaction to proceed further to form a substantial amount of hydrocarbon monoisocyanate, the unreacted or loosely bound phosgene is removed from the reaction mass at a suitable temperature, more particularly at a temperature not higher than about 100 C. and preferably at a temperature not exceeding about 50° C. The amine hydrochloride (primary, monohydrocarbon amine hydrochloride or tertiary hydrocarbon amine hydrochloride or mixture of the two) is removed from the residue by any suitable means, e. g. by filtration, centrifuging, decanting off the supernatant liquid, etc., after which the hydrocarbon-carbamyl chloride in the residue is converted to the corresponding hydrocarbon monoisocyanate by suitable means, e. g., by methods such as have been mentioned hereinbefore, and the isocyanate thereby produced is recovered. When a primary, monohydrocarbon amine corresponding to the isocyanate desired is the sole amine introduced into the reaction mass, optimum overall yields of isocyanate are obtained when the by-product hydrocarbon amine hydrochloride is converted to the free base, and the recovered hydrocarbon amine is then re-used in the process.

In practicing our invention, reaction between the primary, monohydrocarbon amine (or mixture of primary, monohydrocarbon amine and tertiary hydrocarbon amine) and the phosgene preferably is effected while the said reactants are dissolved or dispersed in a liquid medium in which they are inert, and which also is inert to the products of the reaction. Examples of such liquid media are benzene, toluene, xylene, dioxane, chlorinated hydrocarbons, for instance carbon tetrachloride, trichloroethylene, ethylene dichloride, chlorobenzenes such as 1,2-dichlorobenzene, ketones such as methyl ethyl ketone, etc., petroleum naphtha, etc. The reaction can be caused to take place in the absence of an inert liquid solvent or diluent, but with attendant difficulties in handling, etc., especially in the case of those amines which are normally solids.

A preferred practice comprises first forming a solution of phosgene in an inert solvent, examples of which have been given hereinbefore, and cooling this solution to a low temperature, specifically to a temperature of the order of −40° C. to +10° C. To the cooled phosgene solution is added gradually, with vigorous stirring, a cooled solution of the hydrocarbon amine, which solution likewise has been previously cooled to a temperature within the range of −40° C. to +10° C. No particular advantages accrue from the use of temperatures below about −40° C. The use of temperatures above about +10° C. results in excessive urea formation.

The proportions of primary, monohydrocarbon amine (or mixture of primary, monohydrocarbon amine and tertiary hydrocarbon amine) and phosgene should be in the ratio of 2 moles of the former to not less than 1 mole of the latter. If substantially less than 0.5 mole of phosgene per mole of the amine (or amines) be employed, excessive urea formation tends to take place. The upper limit of phosgene is not critical, large amounts merely adding to the difficulty of removing the excess. The preferred proportions of primary, monohydrocarbon amine (or mixture of primary, monohydrocarbon amine and tertiary hydrocarbon amine) and phosgene are in the ratio of 1 mole of the former to from 1 to 4 moles of the latter. Higher amounts of phosgene, however, are not precluded, as has been indicated hereinbefore, and may range up to 5 or 6, or even as much as 7 or 8, moles of phosgene per mole of the amine. More than about 4 moles of phosgene per mole of amine is of little value in obviating or minimizing urea formation.

The ratio of the liquid solvent or diluent to the primary, monohydrocarbon amine (or mixture of amines) and phosgene is not critical and may be varied as desired or as conditions may require. Thus, the inert liquid medium may constitute, for example, from 5% to 97–98% by volume of the reaction mass.

The reaction which takes place between the primary, monohydrocarbon amine and the phosgene at the low temperature employed in practicing our invention is illustrated by the following equation:

II    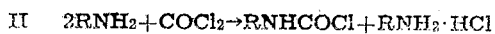
$$2RNH_2 + COCl_2 \rightarrow RNHCOCl + RNH_2 \cdot HCl$$

With some amines, the carbamyl chloride will dissociate to a considerable extent at the temperatures used in accordance with the following equation:

III    
$$RNHCOCl \rightleftharpoons RNCO + HCl$$

Also, some reactive amine hydrochlorides may be partially converted to the corresponding carbamyl chloride in accordance with the following equation:

IV    
$$RNH_2 \cdot HCl + COCl_2 \rightarrow RNHCOCl + 2HCl$$

and this carbamyl chloride may dissociate to the isocyanate as illustrated in Equation III.

Continuing the description of the preferred procedure in practicing our invention:

After adding all of the cold solution of the amine to the cold solution of the phosgene, the temperature of the reaction mass is raised to a suitable point and the excess (unreacted) phosgene is expelled. Preferably the reaction mass is heated to a temperature not higher than about 100° C. and, if heated above 100° C., the time at that higher temperature should be kept to a minimum, for instance not more than a few minutes. Best results are obtained when the reaction mass is heated not higher than 50° C., e. g., about 40° C., during the expulsion of the unreacted phosgene. Even at these lower temperatures some aliphatic hydrocarbon isocyanates, e. g., allyl isocyanate, will trimerize to the corresponding isocyanurate in accordance with the following equation:

V 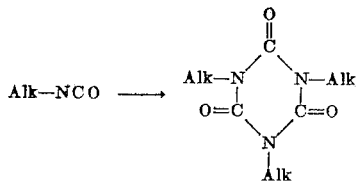

Similarly, the aromatic hydrocarbon isocyanates are more slowly polymerized, probably to the uretidinediones in accordance with the following equation:

VI 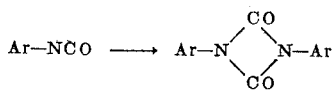

In Equation V "Alk" represents an aliphatic hydrocarbon radical, while in Equation VI "Ar" represents an aromatic hydrocarbon radical.

Ordinarily the unreacted or excess phosgene is expelled from the reaction mass under heat at atmospheric pressure, but in some cases it is advantageous to remove the phosgene under reduced pressure. During the evolution of the phosgene, hydrogen chloride also is expelled to some extent. When low-boiling isocyanates are being produced, the phosgene should not be expelled too rapidly as otherwise isocyanate formed from the corresponding carbamyl chloride may be distilled.

The amine hydrochloride is insoluble in the reaction mass after the phosgene has been driven off, and can be removed therefrom by any suitable means, e. g., by filtration, centrifuging, etc.

After separating the amine hydrochloride from the solution, the resulting solution containing the hydrocarbon-carbamyl chloride and any hydrocarbon monoisocyanate present therein is suitably treated to convert the said carbamyl chloride to the corresponding hydrocarbon monoisocyanate. This can be done, for example, by heating the solution under atmospheric, subatmospheric or superatmospheric pressure at a temperature sufficiently high to split off HCl and thereby convert the hydrocarbon-carbamyl chloride to the corresponding monoisocyanate. Alternatively, the hydrocarbon-carbamyl chloride can be dehydrochlorinated to yield the corresponding monoisocyanate by treating the solution with a dehydrochlorinating agent, for instance a base, especially such bases which are insoluble in the inert liquid solvent or diluent employed, and more particularly such inorganic bases as the alkali-metal hydroxides (e. g., sodium and potassium hydroxides, etc.), oxides of alkaline-earth metals (e. g., calcium oxide, etc.), magnesium oxide, etc., and organic bases, especially quinoline, pyridine, triethyl amine, dimethyl aniline, etc. An excess of the base over stoichiometrical proportions preferably is employed.

If desired, the monoisocyanate which is formed can be separated from the solvent by distillation. In this way it can be freed of impurities such as any isocyanurate, urea and/or uretidinedione that may be present. In the case of aliphatic monoisocyanates which are isolated and purified by distillation, the temperature of distillation should be sufficiently low to avoid trimerization of the isocyanate.

In most cases the by-product amine hydrochloride which is isolated can be converted to the free base merely by treating it with an aqueous alkali solution, and recovering the free amine by conventional means. Other known means of converting the amine hydrochloride to the free base can be employed as desired or as conditions may require.

As has been indicated hereinbefore, instead of using solely a primary, monohydrocarbon amine corresponding to the isocyanate to be produced in the reaction with phosgene, we can use a tertiary hydrocarbon amine to replace that portion of the said primary amine which is in molar excess of that required for the formation of the hydrocarbon-carbamyl chloride; or, otherwise stated, we can use a tertiary hydrocarbon amine instead of the excess primary amine that is converted to the monohydrocarbon amine hydrochloride. In this modification of our invention the tertiary hydrocarbon amine advantageously is incorporated into the reaction mass as follows:

A suitable amount, e. g., 1 mole, of the tertiary amine dissolved in an inert solvent (examples of which have been given hereinbefore) is cooled to a temperature of from —40° C. to +10° C. Phosgene is passed into the cooled amine solution in an amount corresponding to about 1 mole thereof for each mole of tertiary amine. An addition compound is formed in accordance with the following equation:

VII 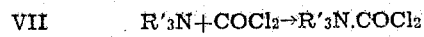

$$R'_3N + COCl_2 \rightarrow R'_3N.COCl_2$$

To the resulting slurry at from —40° C. to +10° C. is then slowly added 1 mole of the primary monohydrocarbon amine, dissolved in an inert solvent, which solution also is preferably at a temperature of from —40° C. to +10° C. The reaction which takes place is illustrated by the following equation:

VIII
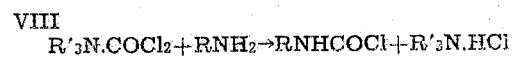
$$R'_3N.COCl_2 + RNH_2 \rightarrow RNHCOCl + R'_3N.HCl$$

The solution containing the carbamyl chloride and the tertiary amine hydrochloride is then processed as has been described more particularly hereinbefore. As in the case of the primary, monohydrocarbon amine which is recovered from the corresponding salt and re-used, so too can the tertiary hydrocarbon amine salt be converted to the free base and be re-used in the process.

Where R appears in the above equations and R' in Equations VII and VIII, each R and R' represents any monovalent hydrocarbon radical unless otherwise indicated by the accompanying text.

As has been mentioned hereinbefore, the primary amines and the tertiary amines that can be used in practicing the present invention can be represented by the formulas $RNH_2$ and $R'_3N$, respectively, and the isocyanates resulting from the method of our invention can be represented by the formula RNCO. In each of these formulas R and R' can be any monovalent hydrocarbon radical, and in the case of the three R' radicals attached to nitrogen they can be the same or different. For purpose of example and not by way of limitation, the following examples are given of monovalent hydrocarbon radicals which R and R' in the above formulas for primary and tertiary amines and isocyanate can be: aliphatic (e. g., methyl, ethyl, propyl, isopropyl, n-butyl, sec.-butyl, tert.-butyl, amyl, isoamyl, hexyl, heptyl, octyl, nonyl, decyl, dodecyl, tetradecyl, hexadecyl, octadecyl, allyl, methallyl, ethallyl, crotyl, 2-butenyl, 3-butenyl, 2-pentenyl, 3-pentenyl, 4-pentenyl, 2-hexyl, 4-hexenyl, 3-methyl-2-butenyl, 3-methyl-3-butenyl, 2 - methyl - 2 - pentenyl, 3-methyl-4-pentenyl, 2 - octenyl, 1,3 - pentadienyl, 2,4-hexadienyl, 3-nonenyl, 2-decenyl, etc.), including cycloaliphatic (e. g., cyclopentyl, cyclopentenyl, cyclohexyl, cyclohexenyl, cycloheptyl, etc.); aromatic (e. g., phenyl, biphenylyl or xenyl, naphthyl, etc.); aliphatic-substituted aromatic (e. g., tolyl, xylyl, ethylphenyl, 2-butenylphenyl, tert.-butylphenyl, etc.); and aromatic-substituted aliphatic (e. g., benzyl, phenylethyl, phenylpropyl, phenylisopropyl, phenyl butyl, phenylamyl, cinnamyl, phenylallyl, etc.). Other examples of monovalent hydrocarbon radicals that R and R' can represent will be apparent to those skilled in the art, as will be the names of the compounds containing these radicals.

In order that those skilled in the art better may understand how the present invention may be carried into effect, the following examples are given by way of illustration and not by way of limitation. All parts and percentages are by weight.

Example 1

A cold (−15° C.) solution of 100 parts of allyl amine in about 520 parts of dry toluene is added over a period of 45 minutes to a solution of 600 parts of phosgene in about 865 parts of dry toluene held at −20° C. This is in a molar ratio of 1.75 moles of allyl amine to about 6.06 moles of phosgene. The toluene solution of the amine is run in continuously through a small-orifice addition funnel extending nearly to the surface of the phosgene solution. The temperature is then raised as rapidly as possible to 45° C. to drive off most of the excess phosgene, which requires about 1 hour. The reaction mass is heated further to 107° C. in one hour, and is held there for 30 minutes to complete the expulsion of the phosgene. Some hydrogen chloride also is evolved. The particles of allyl amine hydrochloride that are formed coalesce but do not completely melt at this temperature. The reaction mass is cooled quickly to room temperature and allowed to stand for about 16 hours, after which it is filtered and the amine salt is washed with fresh dry toluene. The salt is dried at low pressure at room temperature, 69 parts of granular crystals being obtained. The weight of the combined toluene solutions is 1563 parts. Titration of aliquots show that 36 parts of allylcarbamyl chloride and 42 parts of allyl isocyanate are present. The sum of these products is equivalent to a yield of 80% based on the unrecovered allyl amine. The toluene solution is divided into three portions which are treated separately as follows:

(1) A portion (514 parts) of the solution is evaporated at reduced pressure at 60° C. (±3° C.) to a residue of 9 parts which is not volatile at 85° C. at 20 mm. pressure. Upon analysis of the distillate (495 parts collected) it is found to contain 0.03 mole of allylcarbamyl chloride and 0.23 mole of allyl isocyanate. The recovery of active allyl derivative (allyl isocyanate plus allylcarbamyl chloride) is 98%, and 70% of the allylcarbamyl chloride in the original solution is converted to the isocyanate. The product at this point is a toluene solution containing 3.9% of allyl isocyanate and 0.69% of allylcarbamyl chloride. This corresponds to 11 mole per cent of allylcarbamyl chloride in the active product.

(2) Another portion (also 514 parts) of the toluene solution is stirred at room temperature with 20 parts of fresh, dry, powdered calcium oxide (3.5 moles of calcium oxide per mole of allylcarbamyl chloride) in order to convert the allylcarbamyl chloride to allyl isocyanate. The stirring is interrupted at intervals, the lime is allowed to settle, and aliquots of the nearly clear solution are analyzed for allylcarbamyl chloride content. The results are given below:

| Elapsed Time in Hours | Residual Allylcarbamyl Chloride in Percent |
| --- | --- |
| 0 | 2.3 |
| 0.5 | 1.3 |
| 2.0 | 0.8 |

No further conversion of the allylcarbamyl chloride to the corresponding isocyanate is obtained in 18 hours. An additional 20 parts of calcium oxide is added. This causes the content of allylcarbamyl chloride to drop to 0.3% within 30 minutes. This corresponds to an 85% conversion of the allylcarbamyl chloride to allyl isocyanate.

(3) To the toluene solution (507 parts) is added 15 parts of dry quinoline (approximately 1.5 moles of quinoline per mole of allylcarbamyl chloride), and the mixture is stirred for 45 minutes at 25° C. The liquid is then distilled at about 60° C. under reduced pressure, the distillate being collected in two fractions. Analysis of these fractions shows the following:

| Fraction | Parts by Weight | Parts by Weight of Allylcarbamyl Chloride | Parts by Weight of Allyl Isocyanate |
| --- | --- | --- | --- |
| 1 | 269 | 0 | 18.0 |
| 2 | 196 | 0 | 2.3 |

From the foregoing it will be seen that the conversion of the allyl isocyanate is quantitative and that the toluene solution of the isocyanate can be concentrated by distillation.

The feasibility of recovering allyl amine from allyl amine hydrochloride produced by the process described above is shown by the following:

The 69 parts (0.74 mole) of amine salt recovered from the foregoing process is mixed with 10 parts of water in a distilling flask and 40 parts (1 mole) of sodium hydroxide in the form of pellets is added. The mixture is stirred and warmed, and within a few minutes a moderate reaction occurs and allyl amine begins to boil. The amine is distilled through a 6-inch column packed with Berl saddles, B. P. 56°–59° C. The distillate weighs 35.7 parts and has a neutral equivalent of 57.0. When the scale of the operation and the mechanical hold-up of material in the distilling apparatus are considered, this corresponds to almost complete recovery of the allyl amine in practically anhydrous form.

The residue from the low-temperature distillation of the crude toluene solution of the isocyanate (material which is not volatile at 85° C. under a pressure of about 20 mm.) weighs 9 parts and does not have the odor of isocyanate. The liquid is heated at atmospheric pressure to a bath temperature of 180° C. to ensure complete removal of toluene, but it is found that the distillate obtained boils at 80°–90° C., accompanied by the evolution of some vapors of hydrogen chloride. This low-boiling material is distilled as completely as possible at a bath temperature of 180°–320° C., leaving a black, tarry residue. The distillate weighs 6.2 parts and has a distinct odor of allyl isocyanate. By analysis it is found that it contains 1.7 parts of allylcarbamyl chloride and 1.8 parts of allyl isocyanate. The presence of this relatively large amount of the desired product in the supposedly non-volatile residue (9 parts) is quite surprising, and is contraindicated by the analytical data given above. The amount of allyl isocyanate and allylcarbamyl chloride recovered at this point increases the overall yield by 10.5%.

The isocyanate solution which has been treated with calcium oxide as described above is distilled. The sample, weighing 413 parts, is evaporated to a small volume at a temperature below 60° C. under reduced pressure. Fresh, dry toluene is added to the residue, and the solution is re-evaporated. This procedure is repeated twice in order to insure that all allylcarbamyl chloride and allyl isocyanate are flushed out. The residue is finally heated for several minutes at 110°–120° C. under a pressure of 5 mm. to remove residual toluene. The non-volatile residue amounts to 6.3 parts and does not have the odor of allyl isocyanate. This material is transferred to a small distilling apparatus and is heated at atmospheric pressure to about 180° C. at which temperature cracking begins. Heating is continued for 30 minutes at 180–220° C. while a total of 3.2 parts of distillate is obtained. This material has a strong odor of allyl isocyanate and, by analysis, is found to contain the equivalent of 1.1 parts of allyl isocyanate and 1.6 parts of allylcarbamyl chloride. From the foregoing it is seen that the isocyanate is generated by pyrolytic cracking of a non-volatile product of the reaction, possibly diallylurea or triallyl isocyanurate. It appears also that hydrogen chloride is simultaneously liberated and may possibly catalyze the reaction or may actually participate in the reaction.

*Example 2*

This example illustrates how the allylcarbamyl chloride remaining after the removal of the allyl amine hydrochloride and unreacted phosgene as described under Example 1 can be converted by thermal decomposition to allyl isocyanate.

To 23.9 parts of crude allylcarbamyl chloride containing 62.8% of allylcarbamyl chloride is added 95.6 parts of kerosene to give a 20% solution. This mixture is heated under reflux at the boiling temperature of the mass. The evolved gases are led into a standard sodium hydroxide solution so that hydrogen chloride elimination can be closely followed by a simple titration. After refluxing for 3 hours the conversion of allylcarbamyl chloride to allyl isocyanate is 65.3%, as calculated from the amount of HCl evolved.

*Example 3*

This example illustrates the use of a tertiary hydrocarbon amine, specifically triethyl amine, in accordance with the present invention.

A solution of 104 parts (1 mole) of triethyl amine in about 520 parts of toluene is dried for about 16 hours with anhydrous sodium sulfate. The solution is filtered, and 300 parts (3.03 moles) of phosgene is added at +10° C. A thick, pasty slurry is obtained. This mixture is held at 0° to +5° C. while a solution of 100 parts (0.75 mole) of p-isopropenylaniline in about 130 parts of dry toluene is added dropwise over a period of 20 minutes. The reaction mass is allowed to warm to 30° C. over a period of 30 minutes and is then heated to 75° C. during 1 hour. Nearly all of the solid material dissolves. Heating is continued with agitation for 4½ hours at 95°–105° C., after which the reaction mass is allowed to stand undisturbed for 16 hours at room temperature (about 30° C.). The reaction mass is evaporated to approximately one-half its volume, cooled and filtered. The separated, water-soluble crystals of amine hydrochloride are washed with a small amount of fresh toluene, and the combined solutions are concentrated further. The initially formed p-isopropenylphenylcarbamyl chloride is converted by thermal decomposition to p-isopropenylphenyl isocyanate in part during the aforementioned heating and concentration steps and in part during the last step of the process. In this last step the concentrated solution of the crude product is fractionally distilled under reduced pressure to recover p-isopropenylphenyl isocyanate as a water-white distillate (B. P. 65°–75° C. at 2–3 mm. pressure) in a yield of about 49% of the theoretical. The residue resinifies, and some amine hydrochloride sublimes at the end of the distillation.

*Example 4*

A cold (about 10° C.) solution of 100 parts (0.76 mole) of p-isopropenylaniline in about 68.5 parts of heptane is added over a period of 20 minutes to a solution of 100 parts (about 1 mole) of phosgene in about 343 parts of heptane held at +10° C. (±2° C.). The mixture is warmed to 50° C. and held at this temperatute for 30 minutes. It is then heated under reflux at 95°–98° C. for 45 minutes to expell the excess phosgene, cooled to +15° C., and the p-isopropenylaniline hydrochloride which precipitates is removed by filtration. The salt is washed thoroughly with heptane, and the filtrate and washings are combined. The resulting water-white solution containing p-isopropenylphenylcarbamyl chloride is concentrated to a high-boiling residue at atmospheric pressure. In the last step of the process the concentrated solution of the crude product is fractionally distilled under reduced pressure to recover p-isopropenylphenol isocyanate in a yield of approximately 60% of the theoretical, based on one-half of the starting p-isopropenylaniline.

The recovered p-isopropenylaniline hydrochloride is converted to the free base by treatment with a 10% aqueous solution of caustic soda, and re-used in making an additional quantity of p-isopropenylphenyl isocyanate as described above, thereby greatly increasing the overall yield of the latter.

*Example 5*

Same as in Example 4 with the exception that the phosgene and p-isopropenylaniline are employed in the ratio of approximately 4 moles of the former per mole of the latter, and the heptane solution of the amine at about −5° to −10° C. is added to the heptane solution of the phosgene, also at the same temperature. Thereafter the excess phosgene is removed by warming the reaction mass at 25°–50° C. over a period of 1½ hours, followed by refluxing for 45 minutes. The salt-free heptane solution of the crude product containing the carbamyl chloride is allowed to stand for about 64 hours at room temperature before concentrating it under heat at atmospheric pressure, and then distilling it under reduced pressure to recover the isocyanate in the same manner as described under Example 4. The yield of colorless p-isopropenylphenyl isocyanate obtained, based on one-half of the starting amine employed, is 63%.

*Example 6*

Same as in Example 1 with the exceptions that instead of 100 parts of allyl amine there is used 128 parts of n-butyl amine, and a saturated hydrocarbon solvent boiling at about 160° C. is used to replace the toluene. Similar results are obtained. The higher boiling solvent is beneficial in the fractional distillation of the product at reduced pressure.

*Example 7*

A solution of 749 parts (0.7 mole) of p-toluidine (p-methylaniline) in about 173 parts of dry toluene is added dropwise over a period of 30 minutes to a well-stirred solution of 116 parts (1.17 moles) of phosgene in about 260 parts of dry toluene while the mixture is held at −5° to −10° C. The thick slurry thereby obtained is heated rapidly to reflux to drive out the excess phosgene and hydrogen chloride which is formed as a by-product in the conversion of any of the p-tolylcarbamyl chloride to p-tolyl isocyanate.

When all of the dissolved gas has been expelled the reaction mass is cooled and filtered to remove the amine salt. The toluene solution is concentrated at atmospheric pressure and then fractionally distilled under reduced pressure to recover p-tolyl isocyanate boiling at about 75° C. under a pressure of 15 mm. The separated p-toluidine hydrochloride contains a small amount of N,N'-di-p-tolylurea from which it is removed by extraction with water. The p-toluidine is recovered from the hydrochloride and recycled in the process.

*Example 8*

Same as in Example 1 with the exception that 187 parts of benzyl amine is used in place of 100 parts of allyl amine. Similar results are obtained.

*Example 9*

Phenyl isocyanate is prepared in essentially the same manner as described under Example 7. However, in this case the reactants consist of a solution of 0.85 mole of aniline dissolved in about 173 parts of toluene and a solution of 2 moles of phosgene dissolved in about 303 parts of toluene. The formation of N,N'-diphenylurea is minimized through the use of a relatively large excess of phosgene. The overall yield of phenyl isocyanate is greater than 70% based on the aniline consumed.

*Example 10*

Same as in Example 1 with the exception that instead of using 1.75 moles of allyl amine there are used 1.75 moles of a cycloaliphatic amine, specifically cyclohexyl amine. The amine hydrochloride is recovered in approximately quantitative yield based on one-half of the starting amine. The salt-free toluene solution containing cyclohexylcarbamyl chloride is treated with quinoline as in Example 1 to give a quantitative conversion to the isocyanate.

We claim:

1. The method of preparing a hydrocarbon monoisocyanate which comprises bringing into intimate contact, at a temperature within the range of −40° C. to +10° C., ingredients comprising a primary monohydrocarbon amine and phosgene in the ratio of 1 mole of the former to not less than 0.5 mole of the latter, removing the amine hydrochloride which is formed and unreacted phosgene from the reaction mass, dehydrochlorinating the hydrocarbon-carbamyl chloride in the residue to the corresponding hydrocarbon monoisocyanate, and recovering the said isocyanate.

2. A method as in claim 1 wherein the hydrocarbon-carbamyl chloride is dehydrochlorinated to the corresponding hydrocarbon monoisocyanate by treatment with a base.

3. A method as in claim 2 wherein the base is calcium oxide.

4. A method as in claim 2 wherein the base is quinoline.

5. A method as in claim 1 wherein the hydrocarbon-carbamyl chloride is dehydrochlorinated to the corresponding hydrocarbon monoisocyanate by thermal decomposition.

6. The method of preparing allyl isocyanate which comprises bringing into intimate contact, at a temperature within the range of −40° C. to +10° C., allyl amine and phosgene in the ratio of 1 mole of the former to not less than 1 mole of the latter, removing the allyl amine hydrochloride which is formed and unreacted phosgene from the reaction mass, dehydrochlorinating the allylcarbamyl chloride in the residue to the corresponding allyl isocyanate, and recovering the said isocyanate.

7. The process of preparing a hydrocarbon monoisocyanate which comprises effecting reaction, in a liquid medium in which they are inert and at a temperature within the range of −40° C. to 0° C., a primary monohydrocarbon amine and phosgene in the ratio of 1 mole of the former to from 1 to 4 moles of the latter, heating the resulting reaction mass at the end of the reaction period to a temperature sufficiently high to volatilize the unreacted phosgene, separating the amine hydrochloride by-product from the resulting mass, dehydrochlorinating the hydrocarbon-carbamyl chloride in the hydrochloride-free residue to the corresponding hydrocarbon monoisocyanate, recovering the said isocyanate, treating the by-product amine hydrochloride with a base to convert it to the corresponding amine, and re-using the recovered amine in the process.

8. The process of preparing allyl isocyanate which comprises effecting reaction, in a liquid medium in which they are inert and at a temperature within the range of −40° C. to 0° C., allyl amine and phosgene in the ratio of 1 mole of the former to from 1 to 4 moles of the latter, heating the resulting reaction mass at the end of the reaction period to a temperature not higher than about 100° C. thereby to volatilize the unreacted phosgene, separating the by-product allyl amine hydrochloride from the resulting mass, treating the allylcarbamyl chloride in the hydrochloride-free residue with calcium oxide thereby to convert the said allylcarbamyl chloride to allyl isocyanate, recovering the said isocyanate, treating the by-product allyl amine hydrochloride with a base to convert it to allyl amine, and re-using the recovered allyl amine in the process.

FREDERIC C. SCHAEFER.
ERHART K. DRECHSEL.

References Cited in the file of this patent

UNITED STATES PATENTS

| Number | Name | Date |
|---|---|---|
| 2,261,156 | Hentrick | Nov. 4, 1941 |
| 2,480,088 | Slocombe et al. | Aug. 23, 1949 |
| 2,480,089 | Slocombe et al. | Aug. 23, 1949 |

OTHER REFERENCES

Jeffreys, Amer. Chem. Journal, vol. 22 (1899), pages 26–27.